United States Patent [19]

Sampas

[11] Patent Number: 6,084,991
[45] Date of Patent: Jul. 4, 2000

[54] CCD IMAGER FOR CONFOCAL SCANNING MICROSCOPY

[75] Inventor: Nicholas M. Sampas, San Jose, Calif.

[73] Assignee: Agilent Technologies Inc., Palo Alto, Calif.

[21] Appl. No.: 09/271,053

[22] Filed: Mar. 17, 1999

Related U.S. Application Data

[63] Continuation of application No. 08/652,873, May 23, 1996.

[51] Int. Cl.[7] ........................................ H04N 3/14
[52] U.S. Cl. ............................. 382/312; 358/458
[58] Field of Search ..................... 358/482, 483, 358/458; 382/312, 317

[56] References Cited

U.S. PATENT DOCUMENTS

| | | | |
|---|---|---|---|
| 4,322,753 | 3/1982 | Ishihara | 358/213 |
| 4,539,596 | 9/1985 | Elabd | 358/213 |
| 5,233,197 | 8/1993 | Bowman et al. | 250/461.1 |
| 5,900,949 | 5/1999 | Sampas | 358/482 |

FOREIGN PATENT DOCUMENTS

| | | | |
|---|---|---|---|
| 2 178 232 | 2/1987 | United Kingdom | H01L 31/00 |

OTHER PUBLICATIONS

*Methods in Cell Biology*, 1989, vol. 29, Part A, Eds. Y-L. Wang and D.L. Taylor., Academic Press, Chapter 13, pp. 207–237, and Chapter 16, pp. 291–313.

*Electronic Light Microscopy*, 1993, Ed. David Shotton, Wiley–Liss, Inc., Chapter 10, pp. 231–246, and Chapter 12, pp. 273–287.

Brakenhoff, G.J. and Visscher, K., "Novel Confocal Imaging and Visualization Techniques", *Trans. R. Microsc. Soc.,* 1990, vol. 1, pp. 247–250.

Brakenhoff, G.J. and Visscher, K., "Confocal Imaging with Bilateral Scanning and Array Detectors", *Scanning,* 1991, vol. 13, Suppl. pp. 65–66.

*Handbook of Biological Confocal Microscopy*, 1989, Ed. J.B. Pawley, Plenum Press, Chapter 11, pp. 113–121.

*Primary Examiner*—Thomas D. Lee
*Assistant Examiner*—Stephen Brinich
*Attorney, Agent, or Firm*—Gordon Stewart

[57] ABSTRACT

A CCD array imager adapted for use as a spatial noise discriminator in confocal scanning microscopy comprises a parallel (vertical) register with a horizontal unmasked imaging row of pixels in tandem with a masked storage array, a serial (horizontal) register for readout, and a means for synchronizing image acquisition in the unmasked row with vertical charge shifting in the storage array such that images are mapped to on-diagonal pixels of the storage array whereas noise is mapped to off-diagonal pixels. A method for using the present invention as a spatial noise discriminator for fluorescence microscopy includes acquiring a fluorescence image in a pixel of the unmasked row of the parallel register, vertically shifting the charges accumulated in the row into the storage array, moving the next fluorescent image horizontally to the next position in the unmasked row, repeating the process to map image information to the on-diagonal pixels of the storage array while segregating noise in the off-diagonal pixels and selectively retrieving image information.

7 Claims, 6 Drawing Sheets

CCD IMAGER FOR CONFOCAL SCANNING MICROSCOPY

CROSS REFERENCE TO RELATED APPLICATION(S)

This is a continuation of copending application Ser. No. 08/652,873 filed on May 23, 1996.

TECHNICAL FIELD

This invention is in the field of CCD imagers. More particularly, it relates to the use of a CCD array as a spatial discriminator in confocal scanning microscopy.

BACKGROUND

Fluorescent molecules have many applications in the biosciences. They can be incorporated into macromolecular probes for measuring the selective binding of the probes to cellular targets. Fluorescence-based bioassays are routinely used to detect, spatially localize and quantitate diverse analytes in biological and clinical samples.

The major advantages of fluorescence detection for bioassay purposes are specificity, spatial resolution, and sensitivity. The sensitivity of fluorescence detection is potentially very high provided that background noise is adequately suppressed and collection of specimen-emitted fluorescence is efficient. Under optimal conditions, it is feasible to detect single fluorescent molecules using fluorescence microscopy (Mathies and Stryer, 1986, cited in Chapter 13, *Methods in Cell Biology* 29: Part A, Eds. Y -L. Wang & D. L. Taylor, 1989).

Background noise is the single most important limitation in the quantitative measurement of fluorescence. Noise from any of the following sources may be substantial: sample fluorescence excited by stray light; background fluorescence from materials in the field of view but not in the focal plane; and contamination of emitted fluorescence with stray excitation light. These problems can be managed by using confocal scanning microscopy with a high sensitivity photodetection device (reviewed in *Handbook of Biological Confocal Microscopy* (Ed. J. B. Pawley) Plenum Press, NY, 1990; and *Electronic Light Microscopy*, Chapters 10 and 12, (Ed. D. Shotton), John Wiley, 1992).

In confocal imaging, a point light source is focused on or within the specimen, thus restricting the field of view to a well-defined focussed spot. The spot is imaged onto a point detector, e.g., a photomultiplier tube (PMT) or a charged couple device (CCD). A CCD array is a preferred detection means for confocal imaging because of its signal integration capability, high detection efficiency and potentially high spatial resolution. See, e.g., Aikens, Agard & Sedat, Chapter 16, In: *Methods in Cell Biology* 29: Part A, Eds. Y -L. Wang & D. L. Taylor, *1989*; G J Brakenhoff and K Visscher (1990), Trans R Microsc Soc 1: 247–250; Scanning 13(Suppl 1): 65–66; and U.S. Pat. No. 5,233,197.

Because of the restricted field of view of the specimen in confocal imaging, scanning in x and y directions (for 2-D image) or x, y and z directions (for 3-D image) is required obtain a complete image. Commonly used techniques for scanning a fluorescent sample include mechanical stage scanning, beam scanning or combined stage and beam scanning. In stage scanning, the illumination and light collection optics are held fixed while the sample is moved laterally through the confocal point of the point light source, where the light intensity is greatest, and the point detector, where the collection efficiency is greatest. Stage scanning provides a wide field of view but a limited scan rate. In beam scanning, the specimen is held stationary while the illuminating light beam is caused to move laterally in the focal plane by an optical system containing a two-dimensional galvanometer-driven scanning apparatus. The galvanometric scanners can be quite fast by comparison with translation stages, typically between 0.1 and greater than 2 Hz for art image of $512^2$ or 512×768 pixels (Shotton, ibid), but the image field of view is limited to that of the objective used. For this reason a field flattening lens, or a post-scanner objective may be required. In combined stage and beam scanning, galvanometric scanning of the beam in one dimension is combined with translation of the sample in a second dimension using a linear mechanical stage.

In confocal imaging, out-of-focus information is rejected by spatially filtering the emitted fluorescence at the primary image plane before the light reaches the detector. Typically, the filter consists of a single small on-axis detector aperture. In order to achieve true confocal operation, the confocal detector aperture is ideally very small. This limits the light that reaches the photodetector and can result in a poor signal to noise level with weakly fluorescing specimens. Thus spatial filtering prior to image detection acts to diminish the fluorescence signal intensifying effects of high numerical aperture (NA) confocal imaging lenses. What is needed is a spatial noise discriminator that combines good background noise suppression with high resolution imaging and high detection efficiency without sacrificing the advantages gained by using high numerical aperture lenses.

SUMMARY OF THE INVENTION

This invention provides a CCD array imaging system that can be used with a confocal scanner to reduce background noise from the image signal as the image is acquired. In essence, the boundaries of the individual wells of the CCD array are used as apertures thus replacing the function of a pinhole detector that is conventionally used as a noise filter in confocal microscopy. The use of a CCD array imager both for detection and for noise suppression in a confocal optical fluorescence scanning system is intended to retain the advantages of high numerical aperture collection optics while providing high resolution, high detection efficiency, good background noise suppression and a small number of moving parts.

One objective of the invention is to provide a CCD array imaging system with an imaging row of unmasked pixels in tandem with a masked storage array, a serial register, and a means for synchronizing vertical charge shifting in the array with beam scanning and image acquisition so as to shift charge out of a well of interest in the imaging row and isolate it from other wells containing noise information.

A second objective of the invention is to provide a method for using the CCD array imaging system as a spatial discriminator. In this method, after an image on a line scan of a sample is captured in a pixel of the imaging row, the entire charge in that row is shifted vertically down into the storage array prior to horizontally shifting the scanning beam image to the next position in the imaging row. This results in on-diagonal pattern of image and off-diagonal pattern of noise in the storage array. The final step is to retrieve the image and discard the noise.

DETAILED DESCRIPTION OF THE INVENTION

Figure 1:
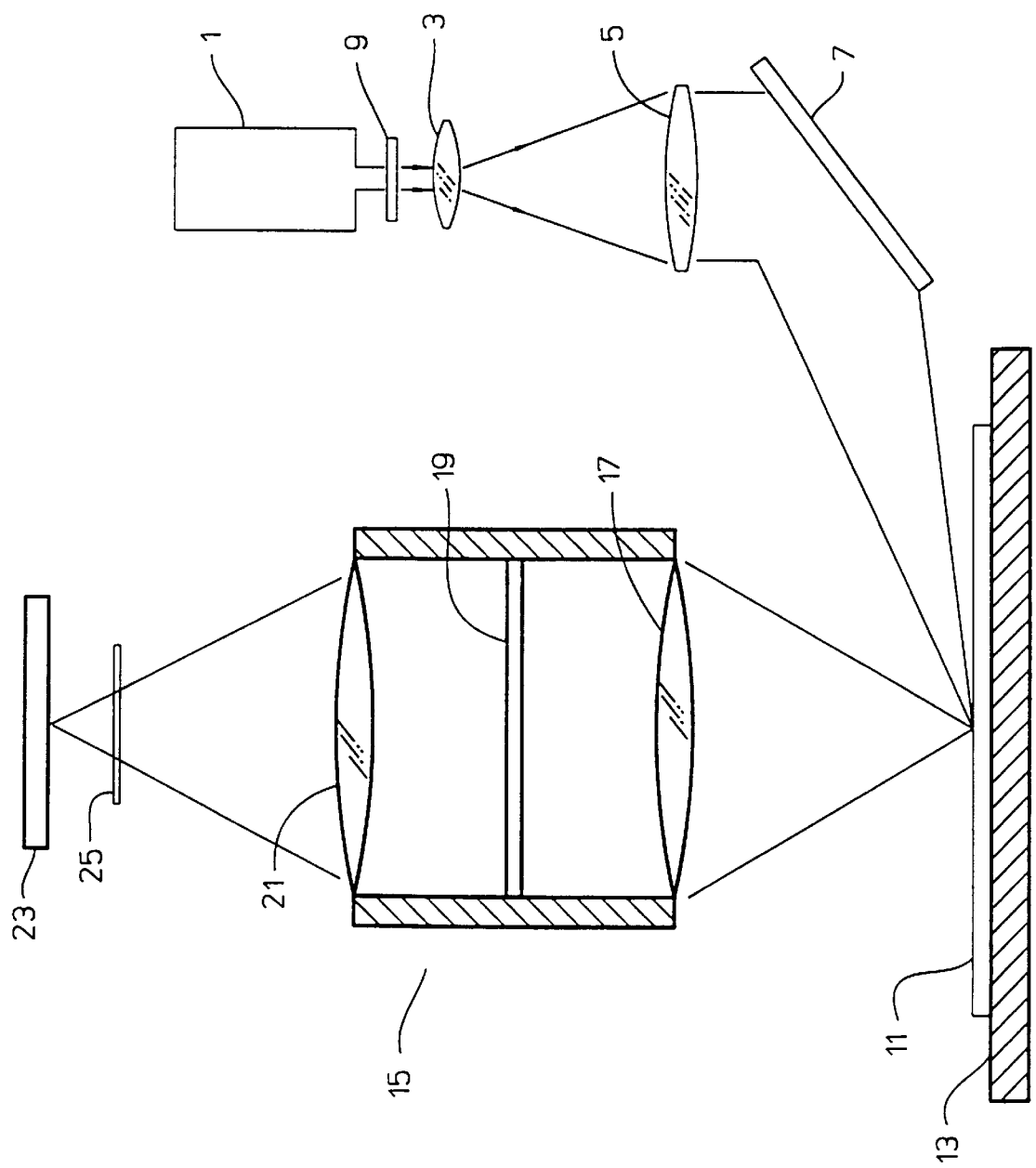
FIG. 1 illustrates schematically an optical scanning system including a CCD array detector in accordance with the invention.

FIG. 1 illustrates general features of a confocal optical scanning device wherein the invention is used. One skilled in the art will recognize that while the following description applies to confocal fluorescence microscopy, the use of the invention is not restricted to fluorescence applications.

The optical incident light path components include: an illumination light beam (1) from an arc lamp or preferably from an ion laser, a beam expander (3), a focusing objective lens (5), a beam scanner (7) and a shutter (9). Any known technique (or combination of techniques) for scanning the sample can be used. These techniques are known to one skilled in the art to include: stage scanning, wherein the objective and optical system remain fixed and the sample is moved (e.g., by a solenoid-driven translation stage); objective scanning, wherein the sample remains fixed and the objective is moved; and beam scanning, wherein the sample remains fixed with respect to the objective lens, but the incident beam moves with respect to the sample. The sample can be scanned in one, two or three dimensions. The invention is preferably used in a scanning system where the sample is scanned in two dimensions or axes. One axis will be referred to hereafter as the slow axis and the other as the fast axis. The use of this terminology is intended to indicate that the two scan rates are unequal in value, and has no meaning with regard to the actual rate of scanning in a particular axis. A linear motor-driven translation stage is preferably used for scanning the slow axis, and a beam scanning device, e.g., a galvanometer-controlled mirror scanner, a rotating polygonal mirror scanner, a Bragg diffractor (or acousto-optic deflector), preferably a galvanometer-controlled mirror, is used for fast axis scanning. However, the term "beam scan" is used herein to refer to the act of moving the illuminating beam across the sample regardless of whether this is accomplished by stage-, objective-, or beam-scanning.

The sample shown generally at (11) is labeled with fluorescent molecules and placed on a translation stage (13). The sample may comprise a biological tissue, a cell monolayer or multilayer, an array of biomolecules immobilized on a substratum or any specimen suitably prepared for visualization by optical microscopy. An illuminating light beam of appropriate wavelength is focused on the sample to excite the fluorescent molecules therein. The term "beam spot" as used herein refers to a single diffraction-limited point of the light beam at the focal plane in the sample. A primary optical image of the fluorescence emission pattern produced by the interaction of the beam spot with the sample, which is hereinafter referred to by the terms "beam spot image", "beam image" or "image of a beam spot", is formed by passing the fluorescent light through a light collection lens assembly shown generally at (15). The collection lens assembly may be located in the optical incident light path or, as shown here, in a separate imaging pathway. The collection lens assembly includes: a compound lens (17) of high numerical aperture to maximize the light collection efficiency and spatial resolving power, an emission filter to block the transmission of stray excitation light (19), and a focusing lens (21) to focus the light to a point on the surface of the CCD array detector (23). The emission filter is omitted from the collection lens assembly for non-fluorescent imaging applications. A shutter (25) or other means of light modulation, preferably digitally-controlled, is placed in the imaging path between the lens assembly and the detector surface. The shutter can be used to control the timing of illumination of an array pixel, if desired. The term "image" is used herein to refer to the electronic charge accumulated by a pixel upon exposure to a beam spot image. Thus, e.g., a charge shift in the array is synonymous with an image shift.

Figure 2:
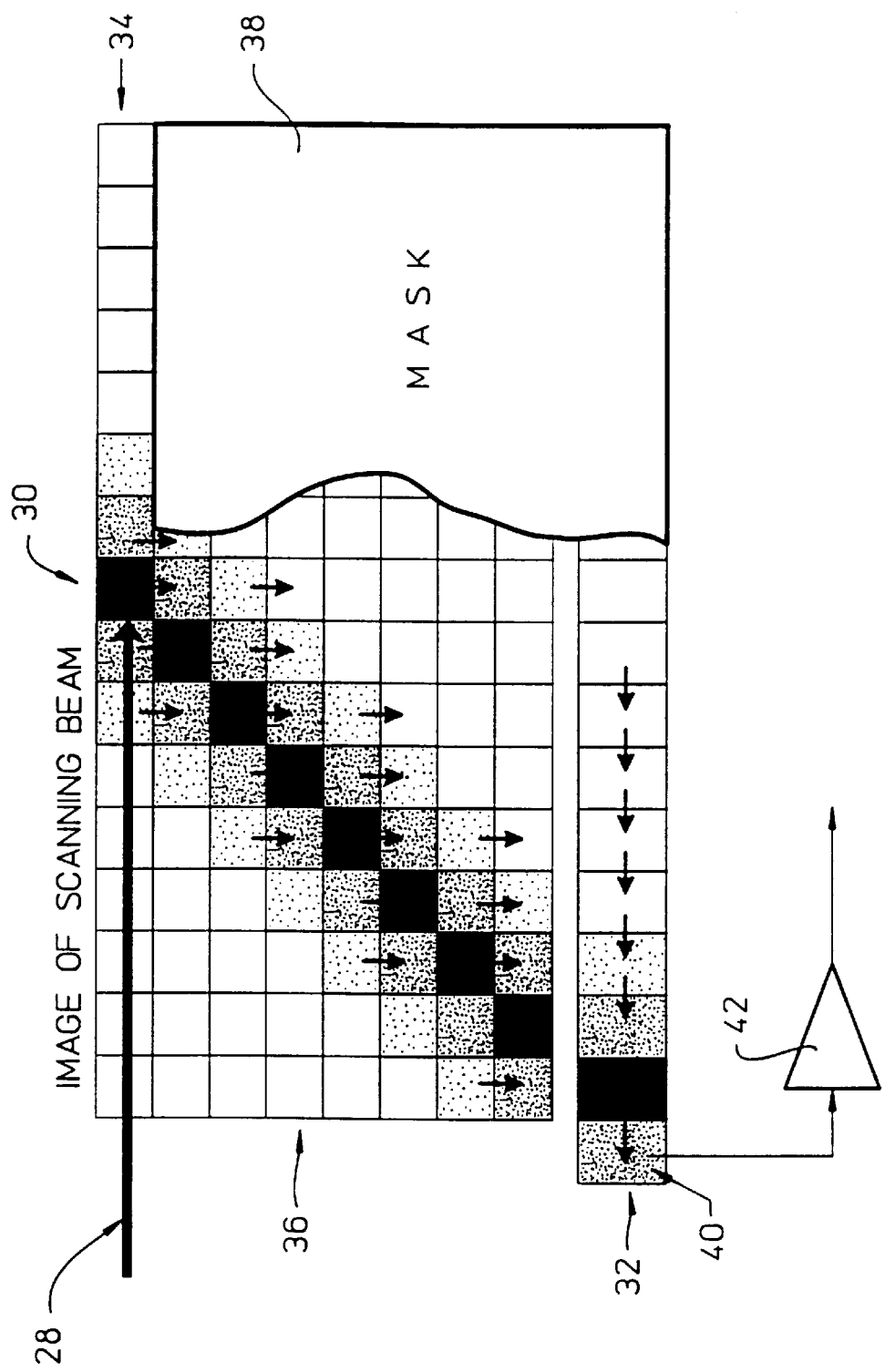
FIG. 2 illustrates the CCD structure and charge transfer pattern of a rectangular embodiment of the invention, where the vertical/horizontal shift ratio is 1.

The use of a CCD array device for confocal imaging is well known in the art, hence only an abbreviated summary of the process is provided herein. The primary optical image is scanned onto a two-dimensional array of silicon photodetector "electron wells" (the "parallel register") which accumulate electrons in proportion to the total integrated flux incident on each photosite. The charge packets are shifted from the parallel register into a one-dimensional CCD (the "serial register") where they are individually shifted toward an on-chip output amplifier. The amplifier signal is proportional to the quantity of charge in each packet. In this way, the scanned image is converted to a pattern of charge that can be read out and measured pixel by pixel and row by row. The CCD array device intended for use in this invention is illustrated in FIG. 2. The principle of operation of the invention is the same regardless of whether the array has a square, linear or rectangular shape. The array is comprised of a parallel (or vertical) register, shown generally at (30), and a serial register (32). The parallel register includes an unmasked imaging row of pixels (34) arranged in tandem with a storage array containing rows and columns of pixels (36). The surface of the storage array is masked by an opaque cover (38) which excludes light from the underlying pixels as each line of the scanned image is recorded in the unmasked row of pixels. The serial (or horizontal) register comprises a single horizontal row of pixels with a readout well (40) and an on-chip output amplifier (42). The shifting of charges in both the parallel and serial registers is accomplished by means of a CCD controller (not shown). The CCD array is preferably adapted for control of temperature. By operating at low temperature, dark current is reduced, and the dynamic range and signal-to-noise ratio are increased.

According to the invention, the CCD array device of FIG. 2 is adapted to function as a spatial discriminator to segregate signal information from background noise during the image acquisition process. The discriminator function is comprised of four operative states of the array:

1. A first state, in which a pixel in the unmasked (imaging) row of the array is momentarily illuminated by a beam spot image from a line scan of the sample;
2. A second state, in which the charge accumulated in an illuminated pixel is shifted vertically to a tandem row in the storage array in synchrony with a horizontal movement of the beam spot image to a next pixel in the unmasked row, the movement of the beam spot image corresponding to a movement of the scan beam on the sample;

3. a third state, in which the charge is shifted out of the storage array and into the serial register; and
4. a fourth state, in which the charge is transferred to the read well of the serial register and is read.

The method by which this invention discriminates image signal from background noise is explained below. A light beam is focussed to a spot on the surface of a fluorescently labeled sample. The beam spot image is aligned with the center of the pixel in the first column in the imaging row of the array. As the beam is scanned across the sample along the fast axis, the beam spot image moves horizontally along the surface of the imaging row thereby exposing the pixels contained therein to illumination. As the beam spot image moves from one pixel to the next (shown by the arrow across the top row), the charge in the top row of the CCD array is shifted vertically downward behind the masked portion of the CCD array. The mask serves to prevent further charge integration due to stray light and thereby acts as a memory for storage of charge induced in a preceding portion of the scan line. For each horizontal shift of the beam spot image to the next pixel in the row, there is at least one corresponding vertical shift of the array. This "freezes" the charge distribution accumulated in the entire row during exposure of a single pixel to the beam spot image. The only useful stored information is the charge of this one illuminated pixel, which will be assembled with others from the scan line to create an image. The synchronization of vertical charge shifting with horizontal beam image scanning segregates the image signal from the background noise (i.e., background fluorescence or scattered light). The image is mapped to the on-diagonal pixels of the CCD array, whereas the off-diagonal pixels contain the noise. When the charge reaches the horizontal register at the bottom of the array, it is individually shifted into a read well for readout and subsequent digitization.

The off-diagonal information can be rejected in real-time as the data is collected, by sweeping the charge into the read well without digitizing it. Alternatively, every pixel can be digitized and collected rapidly during the scan and then post-processed to determine which array pixels are to be retained for image reconstruction. In the latter procedure, curve fitting techniques are used to calculate the image profile. See, e.g., Chapter 14, Modeling of Data, In: "Numerical Recipes", Eds. W.H. Press, B. P. Flannery, S. A. Teukolsky, & W. T. Vetterling, 1986. This procedure has the advantage of reducing the requirement for precise absolute alignment of the beam image on the CCD array with the beam spot on the sample but requires more data storage capacity and has a somewhat reduced background discrimination capability as compared with real-time processing.

The practice of this invention depends upon: optimization of the beam image size relative to the pixel size; proper alignment of the beam image on the CCD array with the beam spot on the sample; and synchronization of the shifting of charge in the CCD array and the data readout with the beam scan.

The optimum beam image size for a given pixel size is empirically determined as the size which maximizes the capture of light from the illuminated region by the CCD electron well and minimizes the entry of light from the surrounding region.

Proper alignment can be accomplished by using a stable optical and sample assembly wherein, at the time of assembly, the system is precisely aligned and fixed permanently in position. The sample is positioned such that, at the start of the linear scan of the fast axis, the image of the beam is at the first column of the first row of the CCD array and at the end of the scan the image is at the last column of the first row of the array. During the scan, real-time realignment of the fluorescent beam image can be performed in synchrony with the scan in the following ways.

One way would be to use optical position sensors located on either side of the array to determine the precise position of the beam image relative to the array pixels during the scan. These sensors, which could be located either on-chip or off-chip, would signal the starting and stopping of the line scan. In one embodiment, the first pixel of the imaging row of the array could be used as the start-scan sensor (refer to FIG. 2). The array could be run in a "seek start-signal" mode, wherein the vertical and horizontal registers are operated in a way that permits the signal from the first well to be read rapidly and repeatedly until a "start-scan" signal is registered by the device (e.g., when the voltage of the device reaches some predetermined level after the image of the beam moves into the first well). The relative sensitivity of this well for beam position sensing could be maximized by coating the remainder of the pixels in the row with a multilayer dielectric coating (i.e., a bandpass optical filter matched to the fluorescent dye emission spectrum). As a result, the uncoated well will become much more sensitive to light scattered by the surface of the sample than to fluorescent light. This scattered light would serve as the "start-scan" position indicator.

Figure 3A:
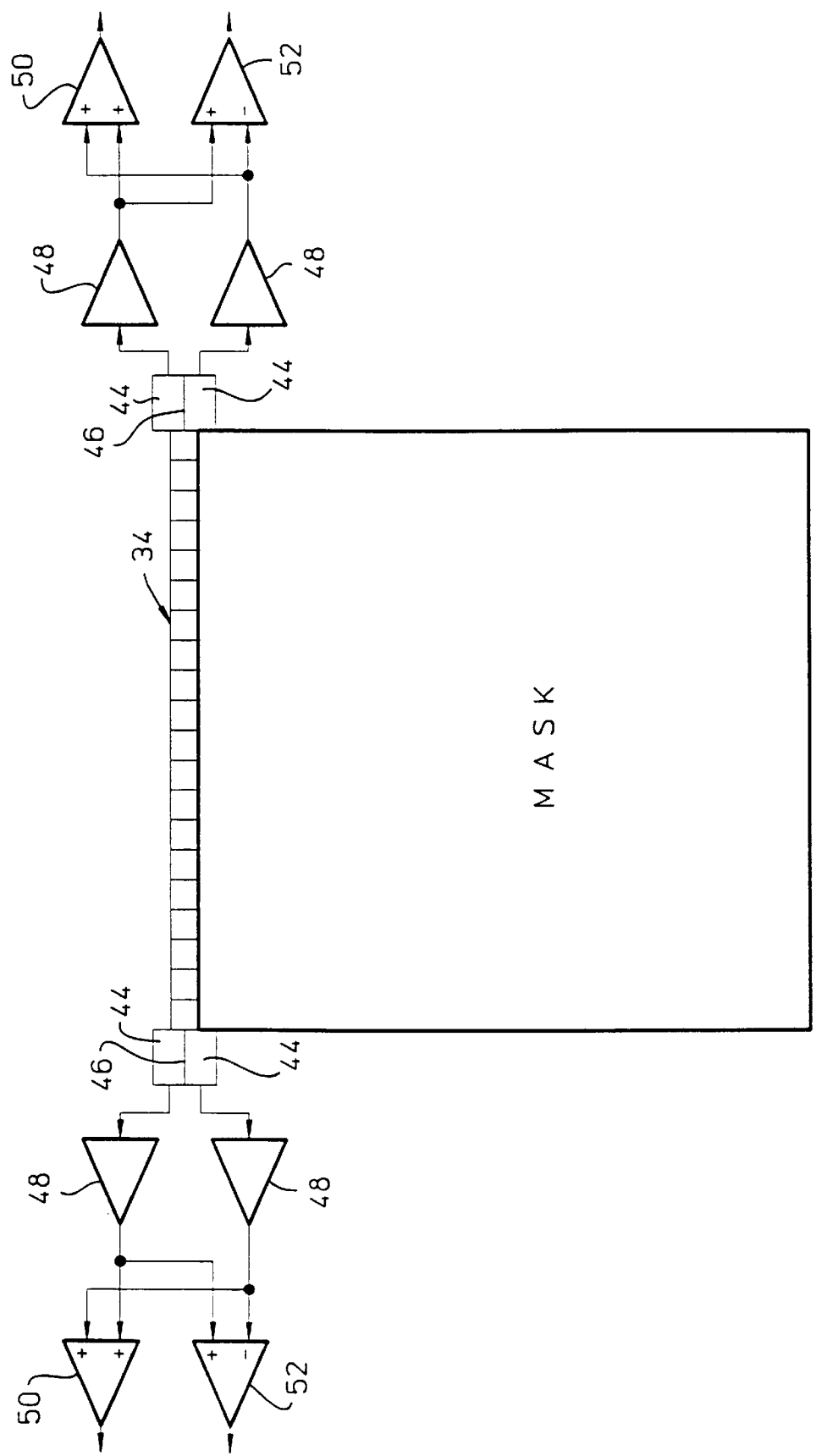
FIGS. 3A–3C illustrate means for synchronizing beam scanning, imaging and data readout: A. An embodiment of a CCD array device with alignment sensing of the beam image relative to the array pixels; B. A block diagram illustrating control of instrumentation for beam and sample positioning; and C. A timing diagram for beam scanning, charge shifting and CCD array readout based on the instrumentation system shown in panel B.

A second way would be to include one or more auxiliary light sensitive wells on either or both sides of the imaging row (FIG. 3A, (44)). These sensors could be conventional CCD read wells or other photosensors. In the arrangement illustrated herein, two on-chip sensors are located on each side of the row. One of each pair of sensors lies vertically above the other such that their common boundary (46) is centered on the axis of the imaging row. Each start or stop well has its own readout amplifier (48) and a pair of summing (50) and differencing (52) amplifiers. The sum of the signals from both of the paired wells establishes a "start-scan" signal or a "stop-scan" signal. The "stop-scan" sensor can be identical to the "start-scan sensor" except that it is triggered by the increase of light onto a photosensitive element to some expected threshold value.

These auxiliary wells could be used as follows to indicate when the beam image was out of alignment with the array. If the beam image were not centered on the boundary between the start-scan sensors, the difference between the readout of the two wells would provide an alignment error signal, whereas if the beam image were properly aligned, a null signal would result. This procedure would be repeated with the stop-scan sensors. Realignment could be performed automatically if the instrument was equipped with alignment adjustment means, or manually during servicing of the instrument.

Precise alignment control can also be achieved with other beam translation devices (e.g., galvanometer-controlled mirrors). Currently, 16-bit galvo positioners are available from General Scanning, Inc. and Cambridge Research which use closed loop servo-control systems to achieve precise alignment control. Other means will be known to one skilled in the art for detecting and precisely aligning the position of the beam image on the array pixels during the scan.

The beam image should be positioned near the center of the pixel during the charge accumulation period in order to maximize image contrast and resolution. One way of accomplishing this is by discontinuous beam scanning. Consider a beam moving from point to point across a sample with the corresponding beam image moving from pixel to pixel in the imaging row. As the beam image centers on each pixel, the movement of the beam is paused while the charge is accumulated in that well. This technique requires the scanning device to have good absolute position control and rapid position settling time.

A preferred approach would be to scan the sample continuously while modulating the light source such that a pixel is only illuminated when the beam image has moved to the central region of the pixel. This is accomplished either by switching the beam on and off or by operation of a shutter that interrupts the collection of emitted light (see FIG. 1, (25), FIG. 3C and accompanying text).

Figure 4:
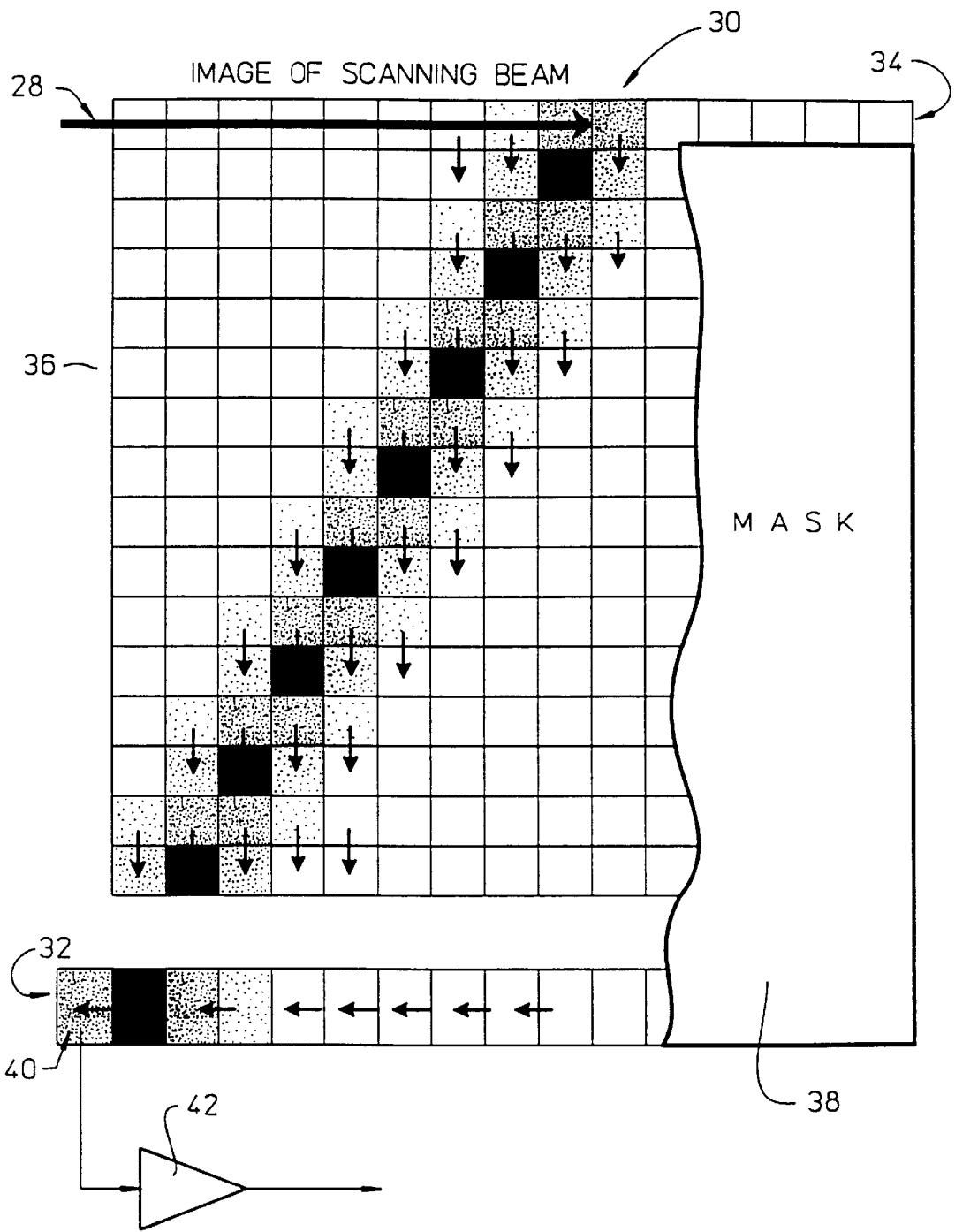
FIG. 4 illustrates the CCD structure and charge transfer pattern of a rectangular embodiment of the invention, where the vertical/horizontal shift ratio is 2.

Another preferred approach would achieve the same result without requiring modulation of the light source and could be used where the beam image size is somewhat greater than the pixel size. In this method, the vertical shifting of rows of the CCD array occurs at some multiple of the frequency of the horizontal movement of the image from pixel to pixel, thus the shifting of the charge replaces the function of the modulation of the beam. For example, by vertically shifting the charge twice each time the beam image traverses the width of a pixel, every other row of the storage array will contain the charge collected while the beam image is at the central region of a pixel, while the interleaved rows will contain the charge from the transitional regions (FIG. 4). When the array is read out, data from the transitional regions can be eliminated and data from the central regions retained for image assembly.

Figure 3B:
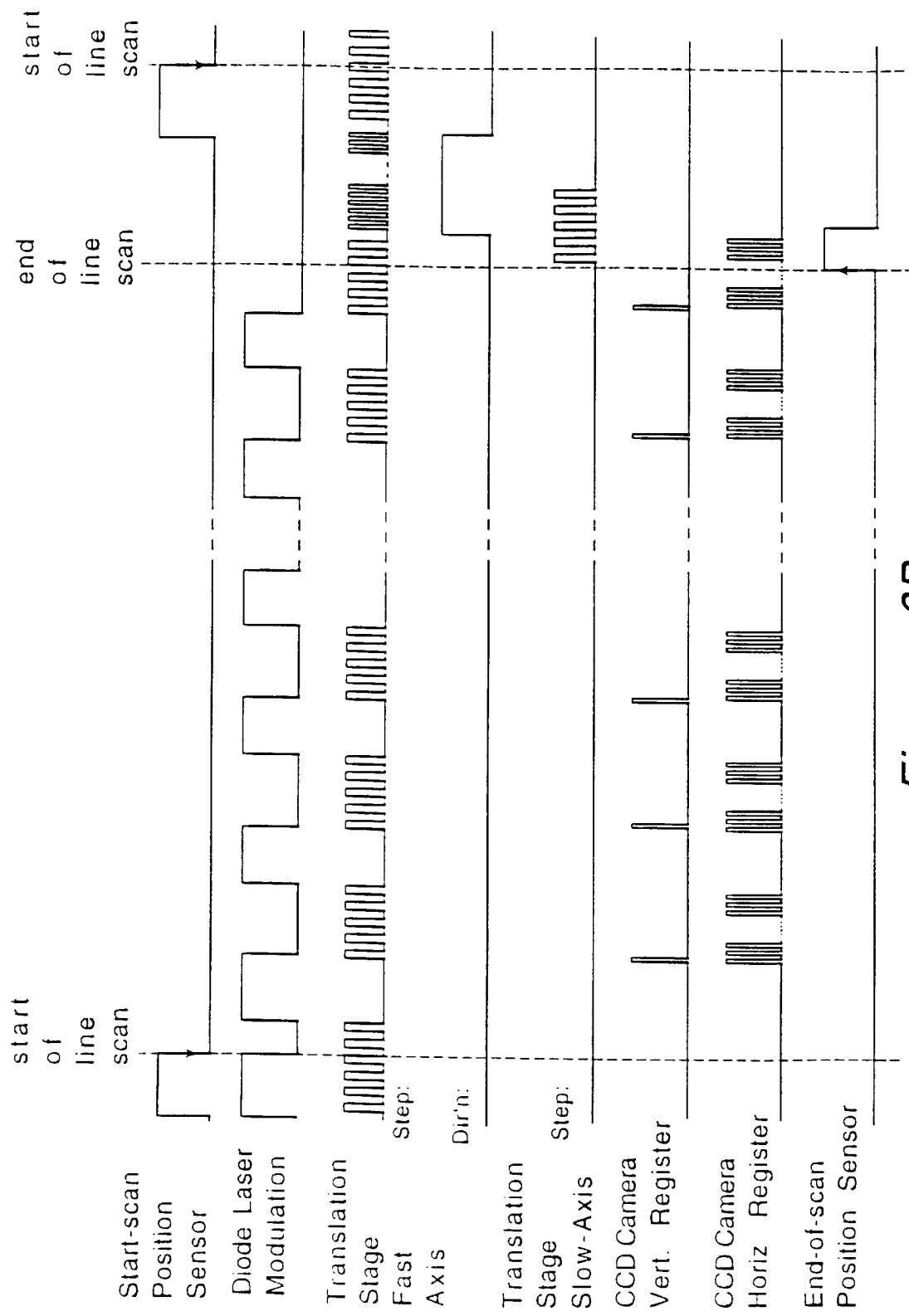
Figure 3C:
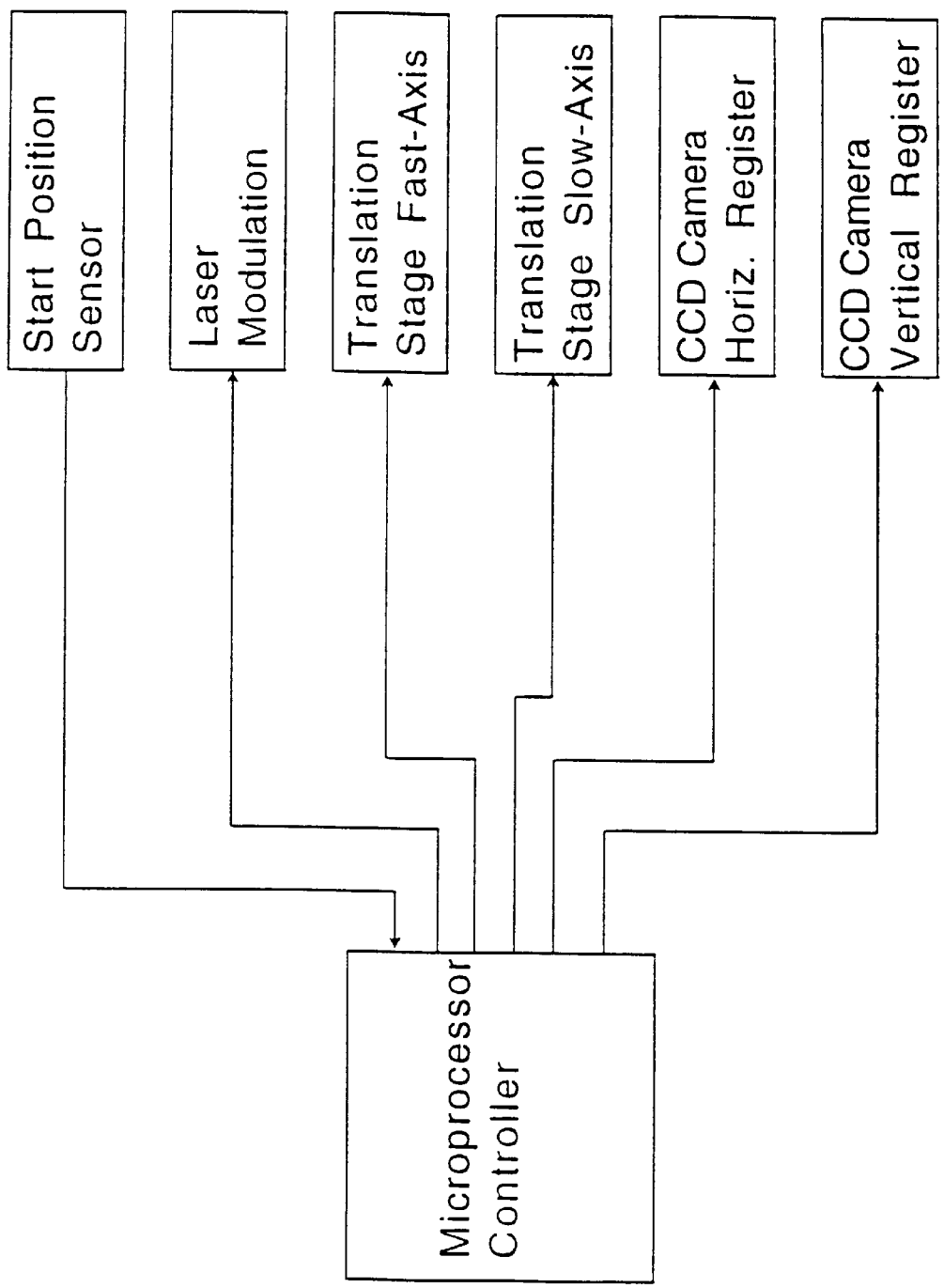

Synchronization of charge shifting and data readout in the CCD array with sample positioning and beam scanning is typically controlled by a microprocessor. There are many different ways of coordinating these steps, one of which is shown in FIGS. 3B and 3C for illustrative purposes. Referring to the block diagram of FIG. 3B, a microprocessor is used to control the timing of the instrumentation required for laser modulation, translation of the beam along the fast-axis and of the sample along the slow-axis, charge-shifting in the CCD vertical register and readout of the CCD horizontal register. The timing sequence for a line scan is initiated by a signal sent from the "start-scan" position sensor to the microprocessor. The position sensor can be a binary device that provides a pulse at certain displacement intervals (e.g., an optical encoder) or an analog device that trigger; a response at a predetermined set of voltage levels. To simplify the discussion, it will be assumed that (1) translation stages are used both for fast- and slow-axis scanning, i.e., one stage moves the beam across the sample along the fast axis, while the other stage steps the sample through the field of view of the imaging row of the CCD array in the slow axis; (2) the translational motions in each axis are generated by stepper motors with reduction gears, micro-stepper motors, or closed-loop DC motor servos with optical encoders for position control, and (3) each incremental step motion is generated by the motor controller in response to an electronic signal. It will be appreciated by one skilled in the art of device control that any of the devices shown in FIG. 3B can be controlled by digital signals and that timing information can be passed back and forth from the controller to an instrument.

The timing diagram for controlling the steps/instrumentation depicted in FIG. 3B is shown in FIG. 3C. In this depiction, one image pixel corresponds to five motor steps.

The microprocessor initiates the scan by stepping the beam across the sample along the fast axis. When the image of the beam moves into the field of view of the imaging pixels of the array, a "start-scan" signal is generated (discussed in greater detail above). Thereafter, as the fast-axis translation stage is periodically stepped to the next pixel, the CCD camera vertical register is stepped once (or optionally twice) per pixel and the horizontal register of the array is read out and recorded by the microprocessor. Also shown here is diode laser modulation, which although not required, maximizes the sharpness of the image and minimizes the photobleaching of the sample. When the position of the beam is centered on each pixel, the laser output is activated to expose the sample to excitation radiation.

At the end of the scan line, the direction of the fast-axis travel is reversed and the beam is repositioned with its corresponding image located at the start position. The end of the scan line can be determined either by counting steps from the start-scan position or by means of a stop-scan sensor, as described previously.

After each line scan, the sample is moved one pixel dimension along the slow-axis. Prior to the start of each successive line scan a complete sweep of the horizontal and vertical registers may be made, if desired, to eliminate charge from stray light and dark current that may have accumulated during the reverse scan sweep.

Line scanning along the fast scan axis may proceed alternately from left to right, then right to left during data acquisition. Alternatively, the scan may be made in a single direction, which would be less-time efficient than bidirectional scanning but would reduce the effects of backlash.

At the end of the entire image scan, the direction of the slow axis motion controller is reversed and the stage is returned to its start position.

Standard CCD image processing techniques are employed to correct for background from stray light and dark current variation, to normalize for fixed pattern noise and to assemble the complete image from the line scan images.

It is to be understood that while the invention has been described in conjunction with specific embodiments thereof, the above description is intended to illustrate and not to limit the scope of the invention. Other aspects, advantages and modifications within the scope of the invention will be apparent to those skilled in the art to which the invention pertains.

What is claimed is:

1. An array imaging system for use in a confocal optical scanning system, comprising:
    a parallel register including:
        an unmasked imaging row of pixels for receiving and recording a scan image as an electronic pattern of charges; and
    a serial register for receiving successive rows from the imaging row for readout;
    a controller for shifting the charges within said array; and
    a means for spatially filtering background noise from the image during the process of recording and storing the image on the array, which means comprises a means for mapping an image to an on-diagonal pattern of pixels from the array while rejecting off-diagonal pixels.

2. An array imaging system according to claim 1 wherein:
    the parallel register additionally includes a masked storage array comprising rows and columns of pixels for receiving and storing the charges from said imaging row; and
    said imaging row and said storage array are arranged in tandem such that the serial register receives successive rows from the imaging row through the storage array.

3. An array imaging system according to claim 1 wherein the array is a CCD array.

4. An array imaging system according to claim 1 wherein the mapping means selectively digitizes the on-diagonal pixels when the pixels are readout from the serial register of said array imager.

5. An array imaging system according to claim 1 wherein the mapping means digitizes all of the pixels from the imaging row and uses an image analysis procedure to extract a signal-containing image from noise.

6. A CCD array imaging system for use in a confocal optical scanning system, comprising:

a parallel register including:
(a) an unmasked imaging row of pixels for receiving and recording a scan image as an electronic pattern of charges; and
(b) a masked storage array comprising rows and columns of pixels for receiving and storing the charges from said imaging row;

wherein said imaging row and said storage array are arranged in tandem;

a serial register for receiving successive rows of said storage array for readout;

a CCD controller for shifting the charges within said CCD array; and a means for spatially filtering background noise from the image during the process of recording and storing the image on the CCD array;

wherein said spatial-filtering means comprises:

a first operative state of said array, wherein an image of a beam spot on a sample scan axis is received and recorded on a pixel of said imaging row;

a second operative state of said array, wherein said image is transferred to a tandem row of said storage array, said transfer occurring in synchrony with a translational repositioning of said beam spot on said sample scan axis, and a translational movement of the corresponding image of ;aid repositioned beam spot to a next pixel in said imaging row;

a third operative state of said array, wherein said image is entered into said serial register for movement to a read well; and a fourth operative state of said array, wherein said image is moved to said read well and is read out from said well;

wherein said array imaging system further includes means for implementing said operative states.

7. A CCD array imaging system according to claim 6, wherein the means for implementing said second, third and fourth operative states comprises:

(a) a position sensor; and
(b) a microprocessor;

wherein:

said position sensor is located on a device for scanning an illuminating beam across a sample, and said microprocessor cooperatively interacts with said position sensor, said beam scanning device and said CCD array controller to synchronize the movement of the scanning beam spot and beam image with the transfer of the recorded image from the imaging row to the storage array, and from the storage array to the serial register for shifting therein to a read well for read out.

* * * * *